US007702496B1

(12) United States Patent  (10) Patent No.: US 7,702,496 B1
Vijendra et al.  (45) Date of Patent: Apr. 20, 2010

(54) METHOD AND APPARATUS FOR ANALYZING AND PROBLEM REPORTING IN GRID COMPUTING NETWORKS

(75) Inventors: Sudhir Vijendra, White Plains, NY (US); William Zahavi, Westborough, MA (US); Patricia Florissi, Briarcliff Manor, NY (US); Danilo Florissi, Briarcliff Manor, NY (US); Amanuel Ronen Artzi, Framingham, MA (US); Jeffrey A. Schriesheim, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 701 days.

(21) Appl. No.: 11/527,992

(22) Filed: Sep. 27, 2006

Related U.S. Application Data

(63) Continuation-in-part of application No. 10/813,842, filed on Mar. 31, 2004.

(51) Int. Cl.
*G06F 17/50* (2006.01)

(52) U.S. Cl. .......................... 703/17; 709/224

(58) Field of Classification Search ............. 703/13–17; 719/310; 709/201, 220, 223, 224; 715/736
See application file for complete search history.

(56) References Cited

U.S. PATENT DOCUMENTS

| 7,200,657 | B2 * | 4/2007 | Adams et al. ............... 709/224 |
| 7,464,159 | B2 * | 12/2008 | Di Luoffo et al. ........... 709/224 |
| 2003/0200347 | A1 * | 10/2003 | Weitzman ................. 709/310 |

OTHER PUBLICATIONS

Oldfield et al., R. Armada: A Parallel File System for Computational Grids, First IEEE/ACM Intnational Symposium on Cluster computing and the grid, May 2001, pp. 194-201.*
Conry-Murray, A. Grid Computing's: Promises and Perils, Network Magazine, Feb. 2004, pp. 30-38.*
Musa, J. Operational Profiles in Software Reliability Engineering, Software, IEEE, Mar. 1993, pp. 14-32.*

* cited by examiner

*Primary Examiner*—Russell Frejd
(74) *Attorney, Agent, or Firm*—Krishnendu Gupta; Joseph D'Angelo

(57) ABSTRACT

A method, device and computer product suitable for performing an analysis on a Grid Computer Network (GCN) is disclosed. The method comprises the steps of representing selected ones of a plurality of components and a relationship among the components in the GCN, providing a mapping between a plurality of events and a plurality of observable events occurring among the components, wherein the mapping is represented as a value associating each event with each observable event, and determining at least one likely causing event based on at least one of the plurality of observable events by determining a measure between each of a plurality of values associated with the plurality of observable events and the plurality of causing events. The step of representing the GCN, comprises the steps of creating at least one non-specific representation of the selected components, wherein the non-specific representations are selected from the group consisting of ComputeElement, GridService and GridServiceInstance, and creating at least one non-specification representation of relations along which the events propagate amongst the selected components, wherein the representations of relations are selected from the group consisting of ComposedOf, Part of, HostedBy, and HostsServices. Also disclosed is an apparatus comprising a processor and a computer program product providing computer instruction to a computing system for executing the method steps described herein.

14 Claims, 10 Drawing Sheets

|        | CED | GSID GS |
|--------|-----|---------|
| CEDown | 1   | 0       |
| GSIDISh| 0   | 0       |

FIGURE 4A

|        | CED | GSID GS |
|--------|-----|---------|
| CEDown | 0   | 1       |
| GSIDown| 0   | 1       |

FIGURE 4B

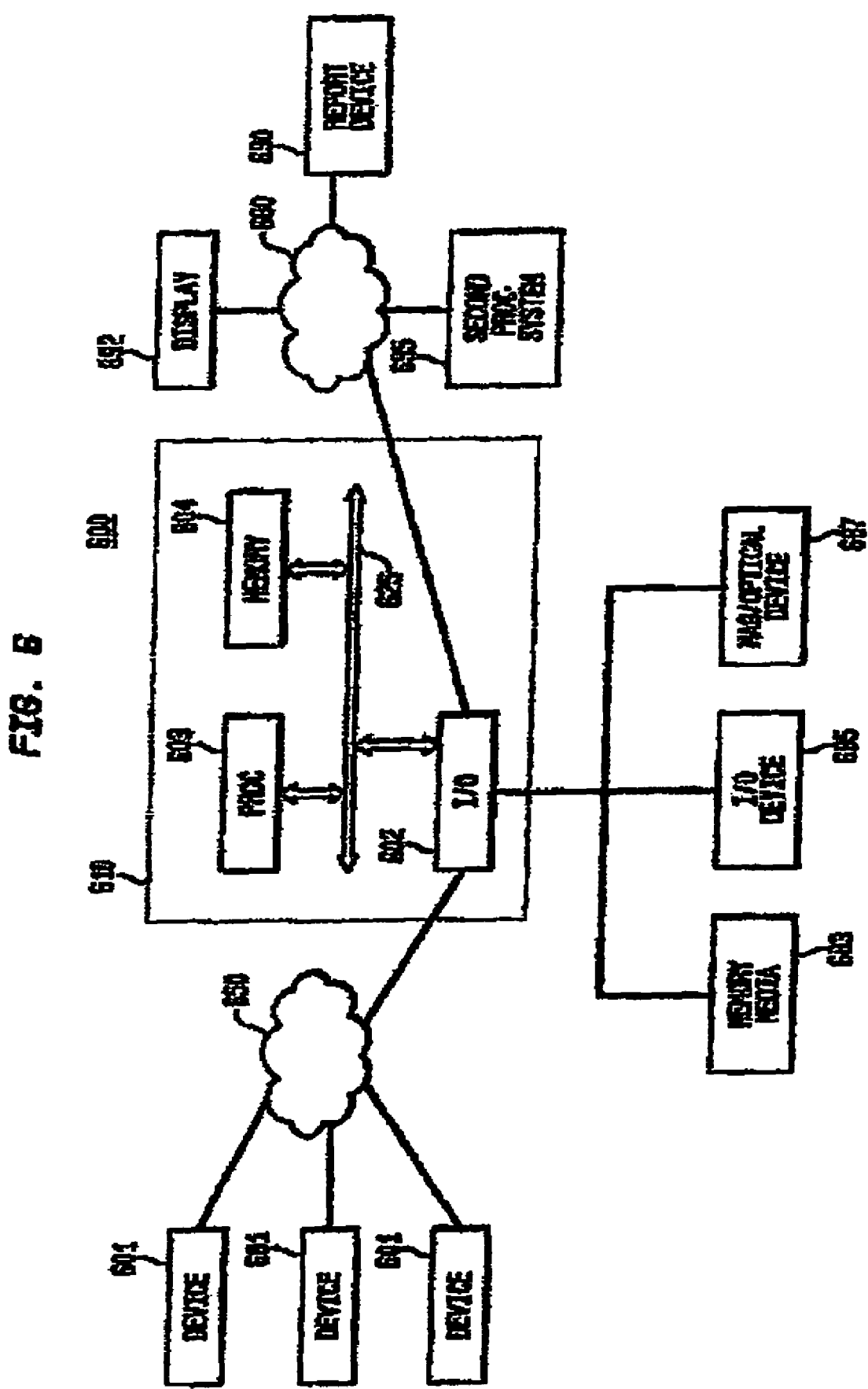

US 7,702,496 B1

METHOD AND APPARATUS FOR ANALYZING AND PROBLEM REPORTING IN GRID COMPUTING NETWORKS

CLAIM OF PRIORITY

This application is a continuation-in-part of, and claims the benefit, pursuant to 35 USC 120, of the earlier filing date of co-pending U.S. patent application Ser. No. 10/813,842, entitled "Method and Apparatus for Multi-Realm System Modeling" filed Mar. 31, 2004, the contents of which are incorporated by reference herein.

RELATED APPLICATIONS

This application is related to U.S. patent application Ser. No. 11/494,250, entitled "Apparatus and Method for Event Correlation and Problem Reporting," filed on Jul. 27, 2006, now U.S. Pat. No. 7,337,090 which is a continuation of U.S. patent application Ser. No. 11/263,689, entitled "Apparatus and Method for Event Correlation and Problem Reporting," filed on Nov. 1, 2005, now U.S. Pat. No. 7,107,185, which is a continuation of U.S. patent application Ser. No. 11/034,192, entitled "Apparatus and Method for Event Correlation and Problem Reporting," filed on Jan. 12, 2005, now U.S. Pat. No. 7,003,433, which is a continuation of U.S. patent application Ser. No. 10/400,718, entitled "Apparatus and Method for Event Correlation and Problem Reporting," filed on Mar. 27, 2003, now U.S. Pat. No. 6,868,367, which is a continuation of U.S. patent application Ser. No. 09/809,769 filed on Mar. 16, 2001, now abandoned, which is a continuation of U.S. patent application Ser. No. 08/893,263, now U.S. Pat. No. 6,249,755, filed on Jul. 15, 1997, which is a continuation of U.S. patent application Ser. No. 08/679,443, now U.S. Pat. No. 5,661,668, filed on Jul. 12, 1996, which is a continuation of U.S. patent application Ser. No. 08/465,754, filed on Jun. 6, 1995, which is a continuation of U.S. patent application Ser. No. 08/249,282, now U.S. Pat. No. 5,528,516, filed on May 25, 1994.

FIELD OF THE INVENTION

The invention relates generally to grid computer networks, and more specifically to apparatus and methods for modeling and analyzing Grid Computer Networks

BACKGROUND OF THE ART

Grid computing is an emerging computing model that provides the ability to perform higher throughput computing by taking advantage of many networked computers to model a virtual computer architecture that is able to distribute process execution across a parallel infrastructure. Grids use the resources of many separate computers connected by a network, e.g., the Internet) to solve large-scale computation problems. Grids provide the ability to perform computations on large data sets, by breaking the data sets down into many smaller operations, or provide the ability to perform many more computations at once than would be possible on a signal computer, by modeling a parallel division of labor between processes. In a conventional environment, resource allocation in a grid computer network is done in accordance with one or more Service Level Agreements (SLAs).

A Grid computing environment is created to address large scale resource needs. The use of recourses, e.g., CPU cycles, disk storage, software programs, peripherals, etc., is usually characterized by the resources' availability outside the context of the local administrative domain. This external provisioning approach entails creating a new administrative domain referred to as a Virtual organization with a distinct and separate set of administrative policies.

One characteristic that currently distinguishes grid computing networks from distributed computing is the abstraction of a distributed resource into a grid resource. One result of abstraction is that it allows resource substitution to be more easily accomplished. Some of the overhead associated with this flexibility is reflected in the temporal latency associated with the access of a grid resource.

As grid computing networks increase in the number of elements utilized and the allocation of element resources, there is a need in the industry for providing a method of modeling Grid computing for determining performance and allocating resources and further for analyzing the network to determine root-cause failures and impacts of such failures.

SUMMARY OF THE INVENTION

A method, device and computer product suitable for performing an analysis on a Grid Computer Network (GCN) is disclosed. The method comprises the steps of representing selected ones of a plurality of components and a relationship among the components in the GCN, providing a mapping between a plurality of events and a plurality of observable events occurring among the components, wherein the mapping is represented as a value associating each event with each observable event, and determining at least one likely causing event based on at least one of the plurality of observable events by determining a measure between each of a plurality of values associated with the plurality of observable events and the plurality of causing events. The step of representing the GCN, comprises the steps of creating at least one non-specific representation of the selected components, wherein the non-specific representations are selected from the group consisting of: ComputeElement, GridService and GridServiceInstance, and creating at least one non-specification representation of relations along which the events propagate amongst the selected components, wherein the representations of relations are selected from the group consisting of: ComposedOf, Part of, HostedBy, and HostsServices. Also disclosed is an apparatus comprising a processor and a computer program product providing computer instruction to a computing system for executing the method steps described herein.

BRIEF DESCRIPTION OF THE FIGURES

The present invention may be better understood by referring to the following description taken into conjunction with the accompanying drawings in which:

FIGS. 4A and 4B illustrate exemplary correlation tables for the causality and impact analysis in accordance with the principles of the invention;

FIGS. 5A-5C illustrate extension of the principles of the present invention to the multiple domains.

Figure 1A:
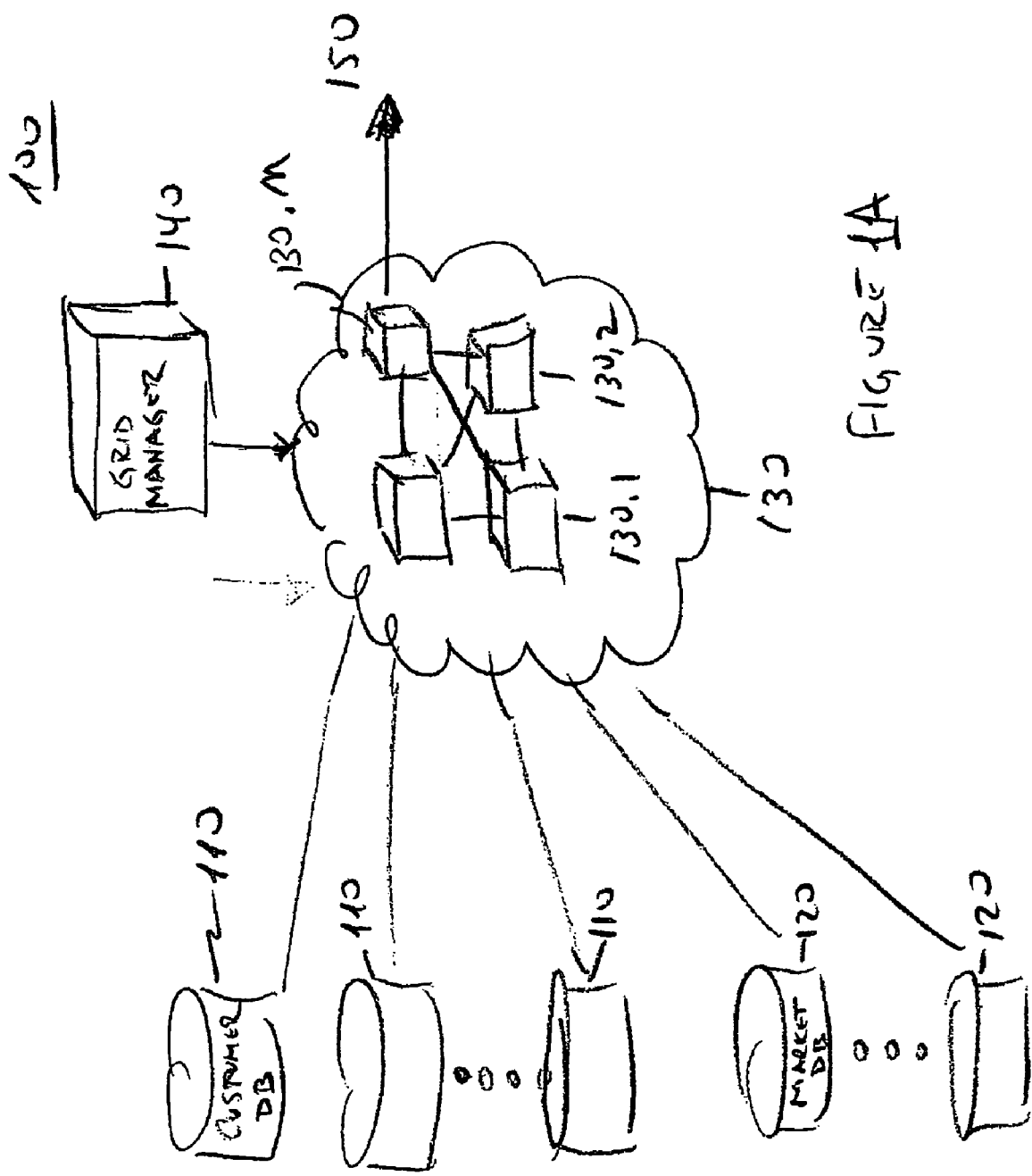
FIG. 1A illustrates a diagram of a conventional Grid computing network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1A illustrates a conventional Grid computing system 100 wherein a plurality of data bases 110 and 120 are in communication with a network 130 of computing devices 130.1-130.*n*. The data bases may contain data related to customers 110 and/or marketing data 120. Although not shown it would be recognized that other types of data bases may be represented and provide data to network 130. Computing devices 130.1-130.*n* represent computer devices that may be in communication with each other via direct connection, as shown, or via a network, e.g., the Internet. Output from the computing network 130 is represented as 150. Grid manager 140 provides control signals to allocate the resources (CPU utilization, memory, software, etc.) of each computing device to perform a desired task.

Figure 1B:
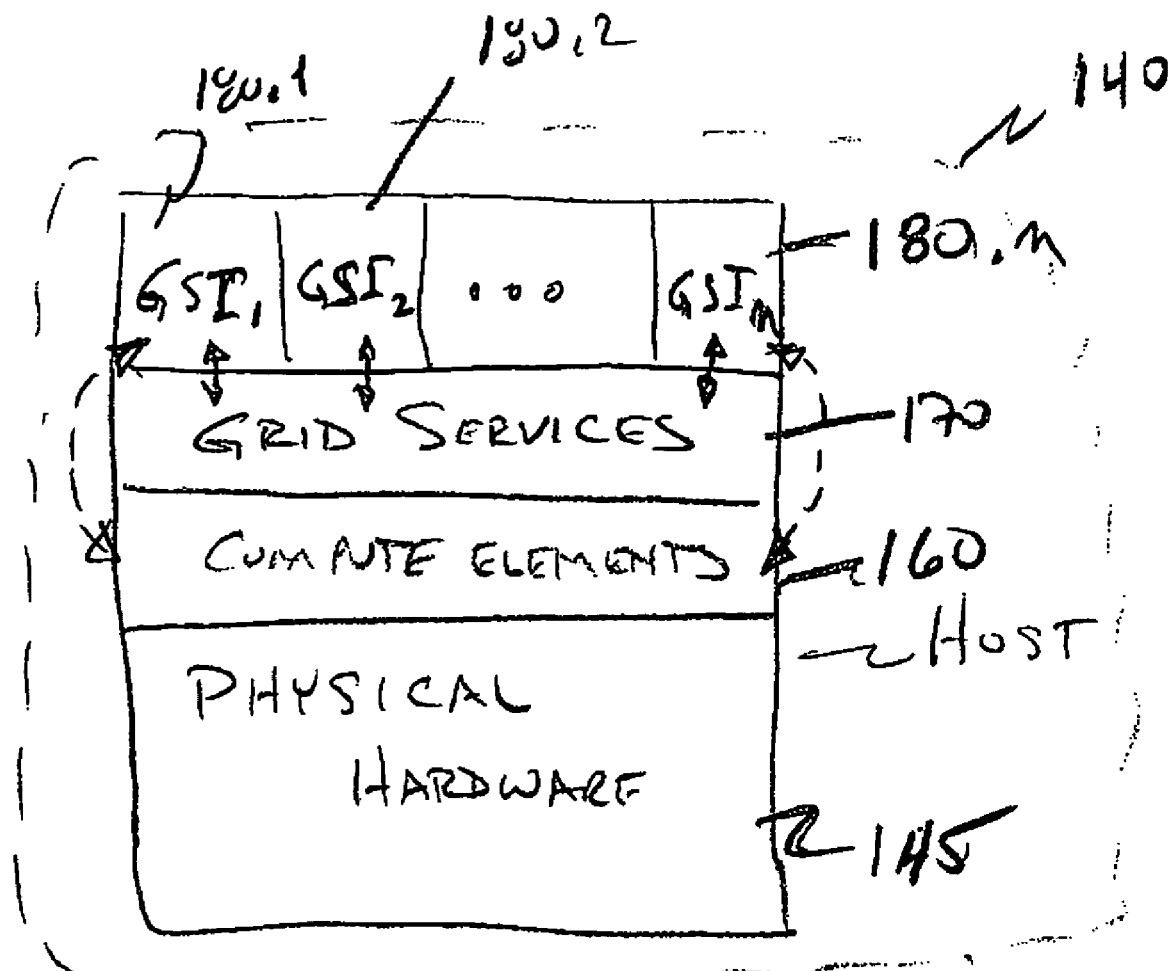
FIG. 1B illustrates a logical representation of a Grid computing server.

FIG. 1B illustrates a logical representation of Grid manager 140. In this illustrative case, manager 140 is represented as a physical hardware element 145, e.g., computer system, that hosts various software and hardware applications. Compute elements 160 represent grid resources that are used primarily for computational purposes. Grid services 170 represent instances of a grid product running on at least on compute element 160. Grid Service Instances (GSI$_i$) 180.1-180.*n* represent instances of a grid service running on a compute element. A grid service includes at least one grid service instances. Grid management services represent a collection of grid services that are used to control, monitor and configure the grid services running in the grid environment.

In this illustrated representation, compute elements 160 communicate with the physical hardware 145 and the grid services 170 to provide a common interface between a plurality of grid services and a plurality of physical hardwares. Similarly, grid services 170 provide a common interface between a plurality of grid service instances 180.1-180.*n* and compute element 160. Also shown are selected grid services instances communicating directly with compute element 160.

Figure 2:
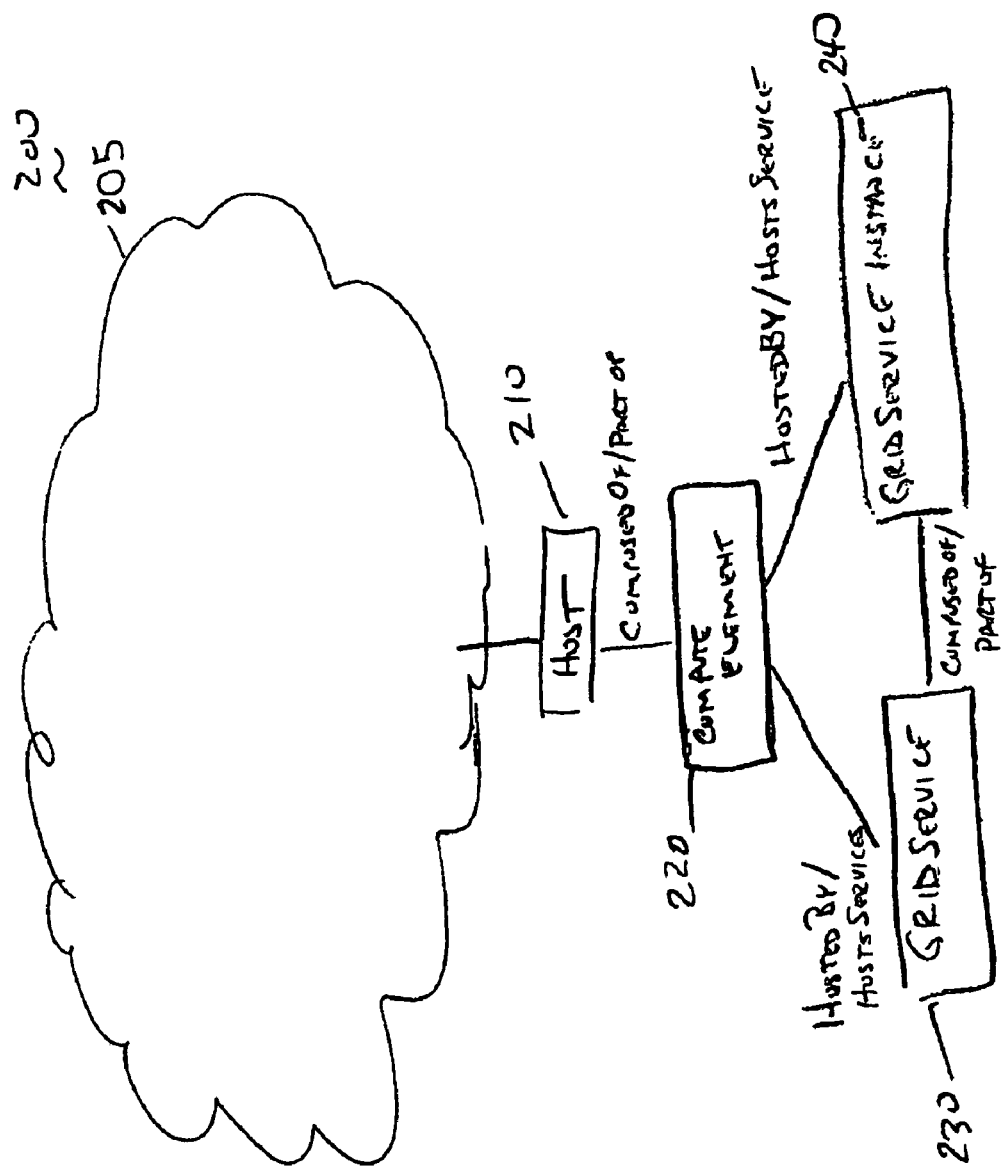
FIG. 2 illustrates a model representation of a Grid computer in accordance with the principles of the present invention.

FIG. 2 illustrates an exemplary embodiment 200 of an abstract model of a Grid computer in accordance with the principles of the present invention. The model 205 shown is an extension of a known network models, such as the EMC® SMARTS® Common Information Model (ICIM), or similarly defined or pre-existing CIM-based model and adapted for a Grid Computing network. EMC and SMARTS are trademarks of EMC Corporation, Inc., having a principle place of business in Hopkinton, Ma, USA. This exemplary model is an extension of the DMTF/SMI model. Model based system representation is discussed in commonly-owned U.S. patent application Ser. Nos. 11/263,689, filed Nov. 1, 2005, now U.S. Pat. No. 7,107,185, and 11/034,192, filed Jan. 12, 2005, now U.S. Pat. No. 7,003,433, and U.S. Pat. Nos. 5,528,516; 5,661,668; 6,249,755 and 6,868,367, and 7,003,433, the contents of all of which are incorporated by reference herein.

Generally, referred-to US Patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific network configuration for which the associated managed component problems may propagate through the network and the symptoms associated with problems may be detected at one or more of the network components. An analysis of the symptoms detected may be performed to determine the root cause—i.e., the source of the problem—of the observed symptoms. Other analysis, such as impact, fault detection, fault monitoring, performance, congestion, connectivity, interface failure, node failure, link failure, routing protocol error, routing control errors, in addition to root-cause analysis, may similarly be performed based on the model principles described herein.

In this illustrative extension of the ICIM model 210, Host object 210 represents the grid device. The grid device which is logically composed of ComputeElement object 220 and ComputeElement object is part of Host object 210. ComputeElement object 220 further hosts associated GridService 230 and GridServiceInstances 240. GridService 230 and GridServiceInstances 240 are related as the GridServiceInstances 240 are part of GridService 230.

Figure 3A:
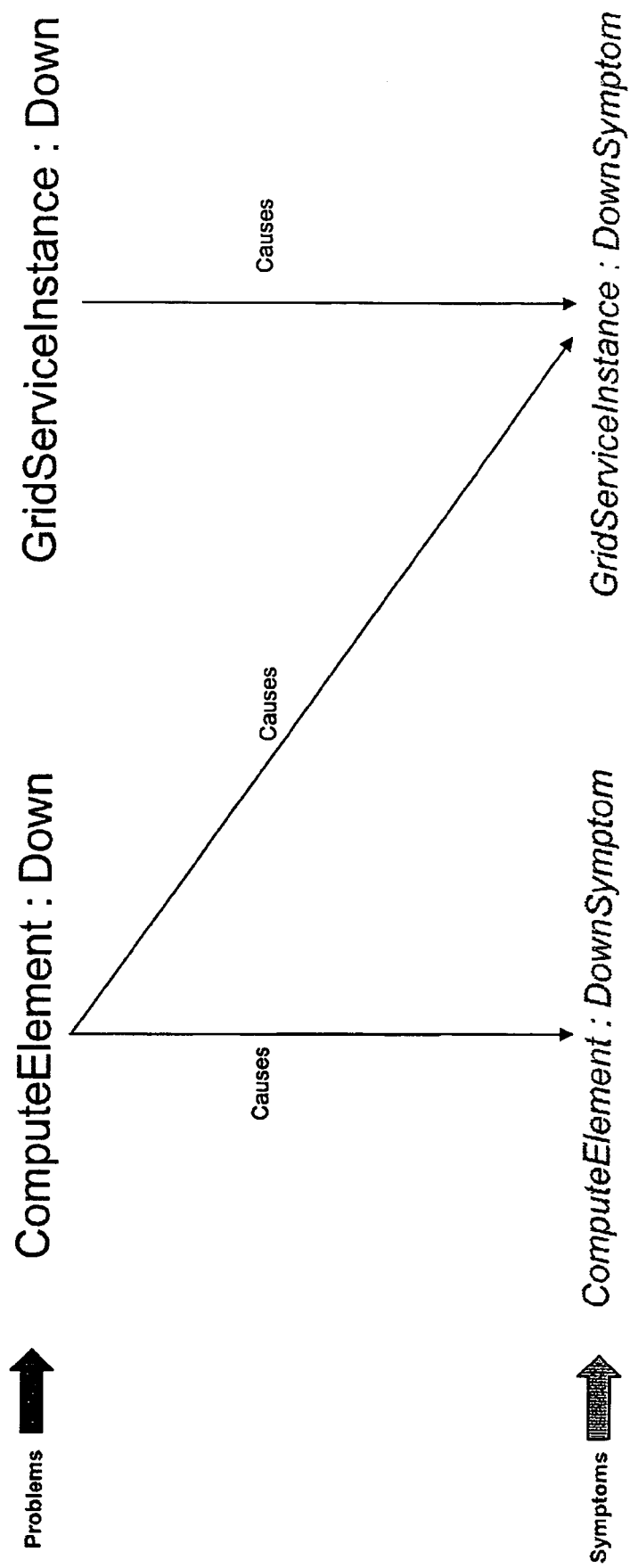
FIGS. 3A and 3B illustrate exemplary causality analysis and impact analysis associated with component failure in a Grid computing network in accordance with the principles of the invention.
Figure 3B:
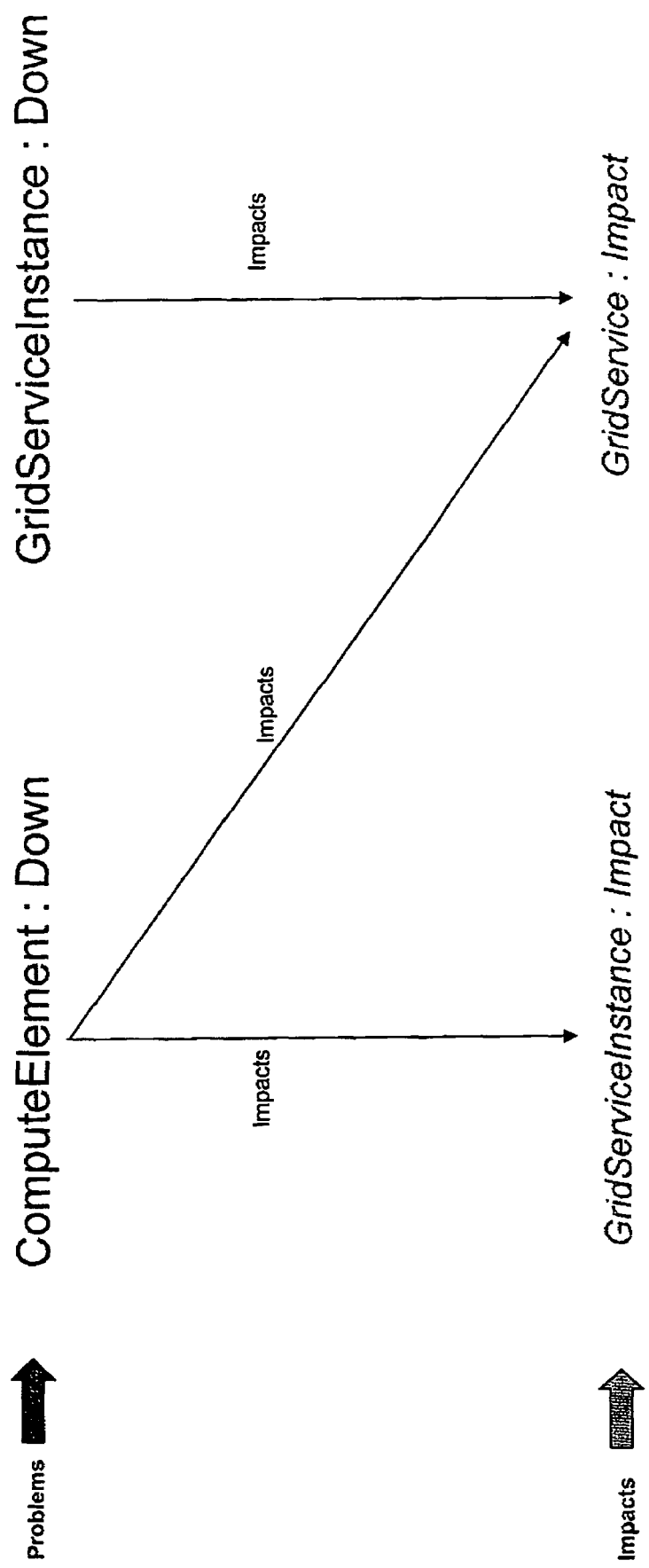

With respect to the model of Grid computing network described herein, a root-cause determination or an impact analysis may be determined by a correlation function, similar to that disclosed in the aforementioned commonly-owned US patents and US patent applications. FIG. 3A illustrates an example of the underlying basis of a root-cause analysis of a grid computing network in accordance with the model representation described herein. In this illustrative example, a problem occurring in compute element 220 generates and causes to be generated events, referred to as symptoms, that indicate computer element 220 is down and a grid service instance 240 to be down. In another example, when a problem occurs in a grid service instance 240 an indication is generated by the grid service instance. FIG. 3B illustrates an example of the underlying basis of an impact analysis of a grid computing network in accordance with the model representation described herein. In this illustrative example, a problem occurring in compute element 220 impacts a grid service instance 240 and grid service 230.

FIGS. 4A and 4B illustrate exemplary data structures for performing a root cause analysis and an impact analysis, respectively, based on the exemplary information illustrated in FIGS. 3A and 3B. For example and referring to FIG. 4A, when a "CE Down" indication is detected, the cause of indication may be determined to be either one or both of the CE or Grid Service Instance is not operating properly (i.e., down). In this case some additional information is needed to uniquely determine the source or cause of the CE Down indication. On the other hand, an indication of GSI Down is uniquely attributed to the GSI not operating properly. As would be recognized, the ability to determine the root cause of a detected problem depends on the model information and the relationships between model information.

FIG. 4B illustrates a similar data structure for performing an impact analysis based on the exemplary information illustrated in FIG. 3B. This data structure illustrates, for example, that a detection of a "CE Down" condition would impact any GSI and GS associated with the CE.

Figure 5A:
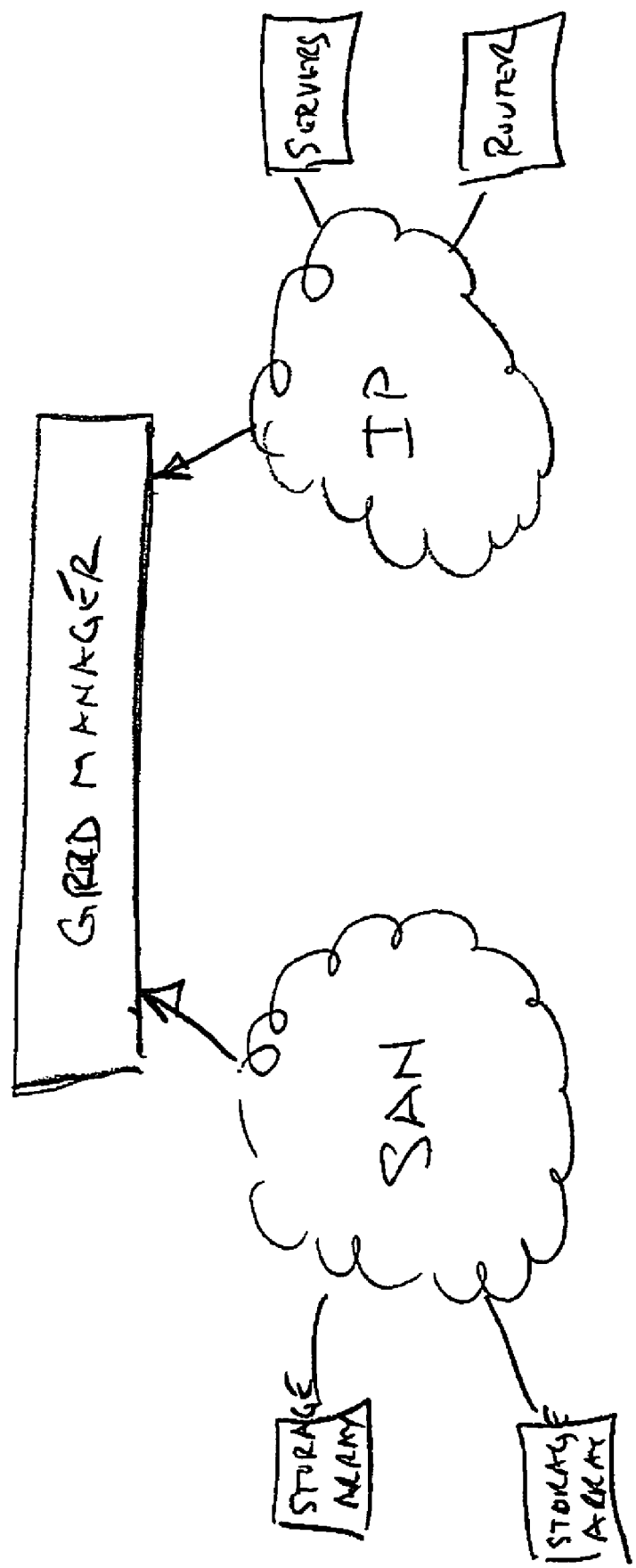
Figure 5C:
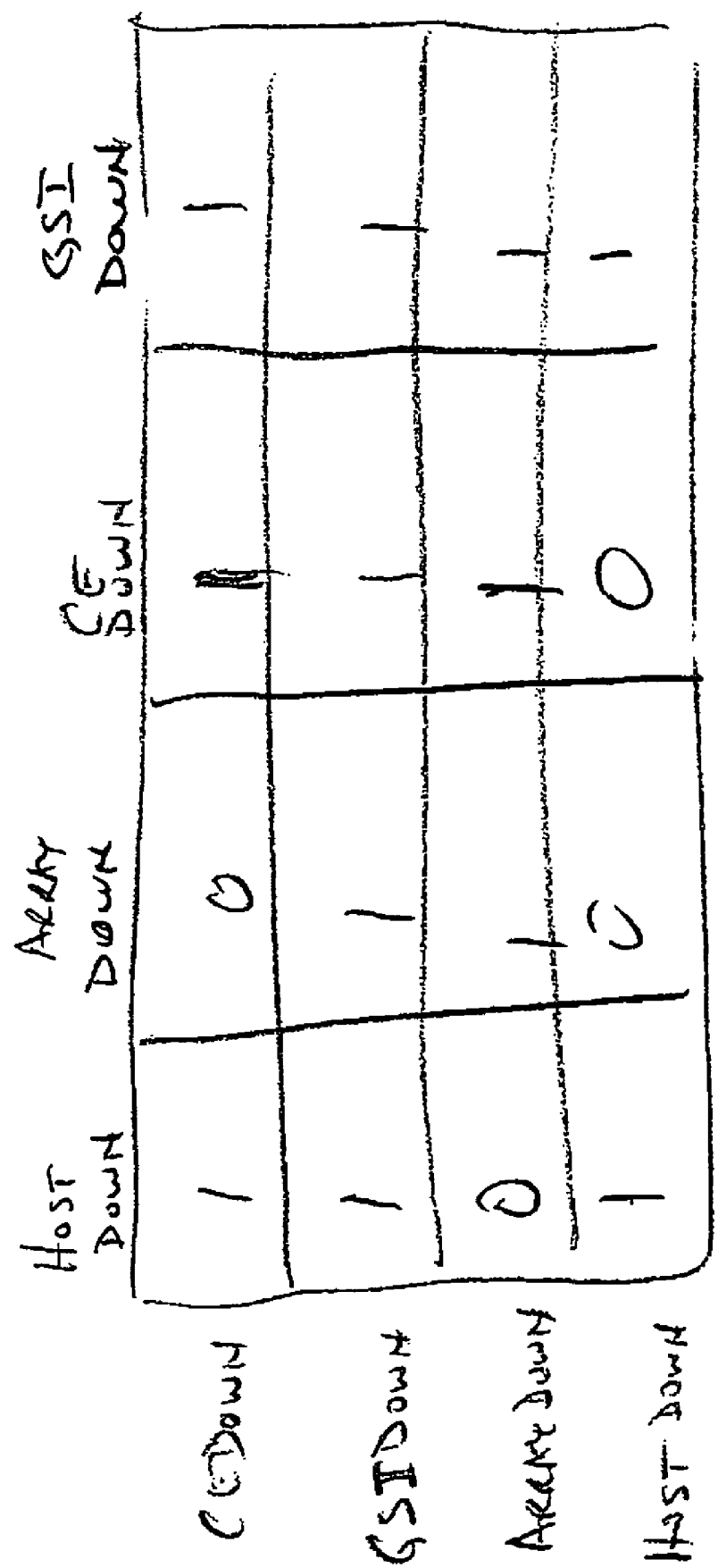

FIGS. 5A-5C collectively illustrate a second aspect of the present invention. Referring to FIG. 5A, Grid Manager 500 is used to manage the resources of an IP network 520 and a storage area network (SAN) 510 to enable user(s) 525 access to data stored on storage array(s) 515. Further illustrated are indications provided to Grid Manager 500 by both IP network 520 and SAN 510. These indications represent processing performed by each network with regard to monitoring and determining causes of faults or impact of faults with each network, similar to the processing described with regard to FIGS. 3A, 3B, 4A and 4B. In one aspect of the invention, Grid Manager 500 may receive all indications from each of the networks 510 and 520 and process the indications as shown in FIG. 3A, for example. In another aspect of the invention, each network 510 and 520 may provide an indication that is a result of individual processing and provide the resultant indication to Grid Manager 510.

FIG. 5B illustrates another aspect where networks 510 and 520 provide indications, for example, root cause indications, to Grid Manager 500 and processor 530 and Grid Manager 500 further provides root cause indications to processor 530. Processor 530, upon receiving the indications, may determine a source or cause of the received indications. In this case, Grid Manager 500, and networks 510, 520 operate as individual domains or realms that perform an independent analysis process and provides the results of the analysis to a specified component to perform a correlation of each of the independently determined results.

FIG. 5C illustrates an exemplary data structure for determining a root cause of a failure detected in the network shown in FIG. 5A or 5B. In this case, indications of ArrayDown, and GSIDown are detected, the source of the generated is determined as "Array Down".

As would be recognized, in complex networks and networks of networks, the number of indications and causes of failures is significantly greater than presented herein. For example, with regard go the above example of "Array Down," additional indications, such as "failure to read/write," "array timeout," etc., may also be provided to the Grid Manager 500 to further determine the cause of a failure. The use of such additional indicators has not been discussed herein to prevent the discussion regarding the principles of the invention to become overly burdensome. However, it would be within the skill of practitioners in the art, to incorporate additional indicators regarding causing events and detected event (problem and symptoms) in view of the teachings provided herein and, thus, the incorporation of additional indicators is considered to be within the scope of the invention described herein.

As would be recognized embodiments of the present application disclosed herein include software programs to implement the embodiment and operations disclosed herein. For example, a computer program product including a computer-readable medium encoded with computer program logic (software in a preferred embodiment).

The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

Figure 6B:
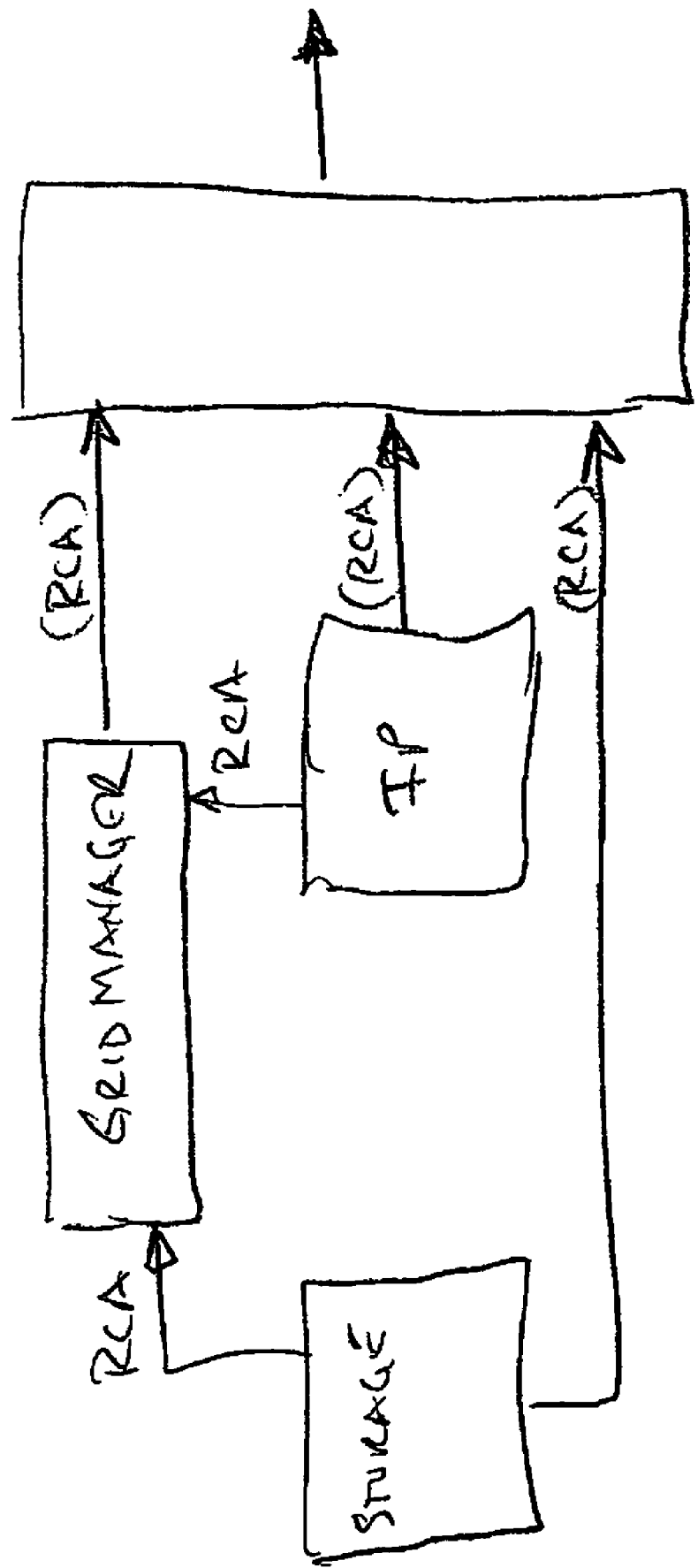
FIG. 6 illustrates a system or apparatus for performing the processing steps described herein.

FIG. 6 illustrates an exemplary embodiment of a system 600 that may be used for implementing the principles of the present invention. System 600 may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired networks, such as POTS, Internet, LAN, WAN and/or private networks, e.g., Intranet, as well as portions or combinations of these and other types of networks.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the client devices 601 is processed in accordance with one or more programs that may be stored in memories 604 and executed by processors 603. Memories 604 may be any magnetic, optical or semiconductor medium that is loadable and retains information either permanently, e.g. PROM, or non-permanently, e.g., RAM. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

The processes shown herein may be represented by computer readable code stored on a computer readable medium. The code may then be stored in the memory 604 and provided to processor 603 as needed. The code may be also read or downloaded from a memory medium 683, an I/O device 685 or magnetic or optical media, such as a floppy disk, a CD-ROM or a DVD, 687 and then stored in memory 604. Alternatively, the code may be downloaded over one or more of the illustrated networks or a network which is not illustrated but in communication with processing system 610. As would be appreciated, the code may be processor-dependent or processor-independent, such as Microsoft Visual Basic and/or Visual C++ and Java. Java is an example of processor-independent code. Microsoft is a registered trademark of the Microsoft Corporation, Redmond, Wash., USA, and Java is a trademark of the Sun Microsystems, Inc., Santa Clara, Calif. USA. Alternatively, the processing described herein may also be platform independent, in that it may operate on one or more well-known operating system (e.g., Unix, Linux, Windows) and that the code may be developed in one or more software development environments.

Information from device 601 received by I/O device 602, after processing in accordance with one or more software programs operable to perform the functions illustrated herein, may also be transmitted over network 680 to one or more output devices represented as display 685, reporting device 690 or second processing system 695.

It is to be understood that the system of the present application can be embodied solely as a software program, or as a software program operating in conjunction with corresponding hardware. For example, embodiments of the present application may be implemented in software applications operating in computer devices that operate the EMC Corporation's Control Center (ECC) or other management software. Control Center software is manufactured by EMC Corporation of Hopkinton, Mass., USA.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. For example, it would be recognized that the invention is not limited by the model discussed, and used as an example, or the specific proposed modeling approach described herein. For example, it would be recognized that the method described herein may be used to perform a system analysis may include: fault detection, fault monitoring, performance, congestion, connectivity, interface failure, node failure, link failure, routing protocol error, routing control errors, and root-cause analysis.

As such, the foregoing description of embodiments of the invention is not intended to be limiting. Rather, any limitations to embodiments of the invention are presented in the following claims.

What is claimed is:

1. A method for performing an analysis on a Grid Computer Network (GCN), the method comprising the steps of:
representing selected ones of a plurality of components and a relationship among the components in the GCN, wherein the Grid Computer Network is represented as plurality of logical domains;
providing a mapping between a plurality of events and a plurality of observable events occurring among the components, wherein the mapping is represented as a value associating each event with each observable event; providing, for each of the domains, a mapping between a plurality of observable events and a plurality of events for the components within the domain, wherein at least one of the observable events is associated with a component associated with at least two of the domains;
determining at least one likely causing event based on at least one of the plurality of observable events by determining a measure between each of a plurality of values associated with the plurality of observable events and the plurality of causing events; and
determining at least one likely event based on at least one of the plurality of observable events by determining a mismatch measure based on the values associated with the plurality of observable events and the plurality of events; wherein the Grid Computer Network is represented as a plurality of logical domains.

2. The method as recited in claim 1, wherein the step of representing the GCN, comprises the steps of:
creating at least one non-specific representation of the selected components, wherein the non-specific representations are selected from the group consisting of: ComputeElement, GridService and GridServiceInstance; and
creating at least one non-specification representation of relations along which the events propagate amongst the selected components, wherein the representations of relations are selected from the group consisting of: ComposedOf, Part of, HostedBy, and HostsServices.

3. The method as recited in claim 1, wherein at least one of the observable events is associated with at least one component associated with at least two of the domains.

4. A method for performing an analysis on a Grid Computer Network (GCN), the method comprising the steps of:
representing selected ones of a plurality of components and a relationship among the components in the GCN,
providing a mapping between a plurality of events and a plurality of observable events occurring among the components, wherein the mapping is represented as a value associating each event with each observable event;
determining at least one likely causing event based on at least one of the plurality of observable events by determining a measure between each of a plurality of values associated with the plurality of observable events and the plurality of causing events; wherein the analysis is selected from the group consisting of: fault detection, fault monitoring, performance, congestion, connectivity, interface failure, node failure, link failure, routing protocol error, routing control errors, and root-cause analysis.

5. An apparatus for performing an analysis on a Grid Computer Network (GCN), the apparatus comprising:
a processor in communication with a memory, the processor executing computer code for executing the steps of:
representing selected ones of a plurality of components and a relationship among the components;
creating at least one non-specific representation of the selected components, wherein the non-specific representations are selected from the group consisting of: ComputeElement, GridService and GridServiceInstance; and
creating at least one non-specification representation of relations along which the events propagate amongst the selected components, wherein the representations of relations are selected from the group consisting of: ComposedOf, Part of, HostedBy, and HostsServices;

providing a mapping between a plurality of events and a plurality of observable events occurring among the components, wherein the mapping is represented as a value associating each event with each observable event, and determining at least one likely causing event based on at least one of the plurality of observable events by determining a measure between each of a plurality of values associated with the plurality of observable events and the plurality of causing events.

6. The apparatus as recited in claim 5, wherein the analysis is selected from the group from consisting of: fault detection, fault monitoring, performance, congestion, connectivity, interface failure, node failure, link failure, routing protocol error, routing control errors, and root-cause analysis.

7. An apparatus for performing an analysis on a Grid Computer Network (GCN), the apparatus comprising:

a processor in communication with a memory, the processor executing computer code for executing the steps of:

representing selected ones of a plurality of components and a relationship among the components, wherein the Grid Computer Network is represented as plurality of logical domains;

providing, for each of the domains, a mapping between a plurality of observable events and a plurality of events for the components within the domain, wherein at least one of the observable events is associated with a component associated with at least two of the domains;

providing a mapping between a plurality of events and a plurality of observable events occurring among the components, wherein the mapping is represented as a value associating each event with each observable event, and determining at least one likely causing event based on at least one of the plurality of observable events by determining a measure between each of a plurality of values associated with the plurality of observable events and the plurality of causing events.

8. The apparatus as recited in claim 7, further comprising the step of:

determining at least one likely event based on at least one of the plurality of observable events by determining a mismatch measure based on the values associated with the plurality of observable events and the plurality of events.

9. The apparatus as recited in claim 8, wherein at least one of the observable events is associated with at least one component associated with at least two of the domains.

10. A computer program product for performing an analysis on a Grid Computer Network (GCN), providing computer instruction to a computing system to execute the steps of:

representing selected ones of a plurality of components and a relationship among the components in the GCN, wherein the Grid Computer Network is represented as a plurality of logical domains;

providing a mapping between a plurality of events and a plurality of observable events occurring among the components, wherein the mapping is represented as a value associating each event with each observable event, wherein the mapping comprises providing, for each of the domains, a mapping between a plurality of observable events and a plurality of events for the components within the domain, wherein at least one of the observable events is associated with a component associated with at least two of the domains; and determining at least one likely causing event based on at least one of the plurality of observable events by determining a measure between each of a plurality of values associated with the plurality of observable events and the plurality of causing events.

11. A computer program product for performing an analysis on a Grid Computer Network (GCN), providing computer instruction to a computing system to execute the steps of:

representing selected ones of a plurality of components and a relationship among the components in the GCN, wherein the step of representing the GCN, comprises the steps of:

creating at least one non-specific representation of the selected components, wherein the non-specific representations are selected from the group consisting of: ComputeElement, GridService and GridServiceInstance; and creating at least one non-specification representation of relations along which the events propagate amongst the selected components, wherein the representations of relations are selected from the group consisting of: ComposedOf, Part of, HostedBy, and HostsServices providing a mapping between a plurality of events and a plurality of observable events occurring among the components, wherein the mapping is represented as a value associating each event with each observable event, and determining at least one likely causing event based on at least one of the plurality of observable events by determining a measure between each of a plurality of values associated with the plurality of observable events and the plurality of causing events.

12. The computer program product as recited in claim 10, further comprising the step of:

determining at least one likely event based on at least one of the plurality of observable events by determining a mismatch measure based on the values associated with the plurality of observable events and the plurality of events.

13. The computer program product as recited in claim 10, wherein at least one of the observable events is associated with at least one component associated with at least two of the domains.

14. The computer program product as recited in claim 10, wherein the analysis is selected from the group consisting of: fault detection, fault monitoring, performance, congestion, connectivity, interface failure, node failure, link failure, routing protocol error, routing control errors, and root-cause analysis.

* * * * *